Feb. 17, 1931.                T. A. BOYD ET AL                1,793,355
                OILING OF FLYERS IN SPINNING AND LIKE FRAMES
                            Filed Dec. 6, 1928
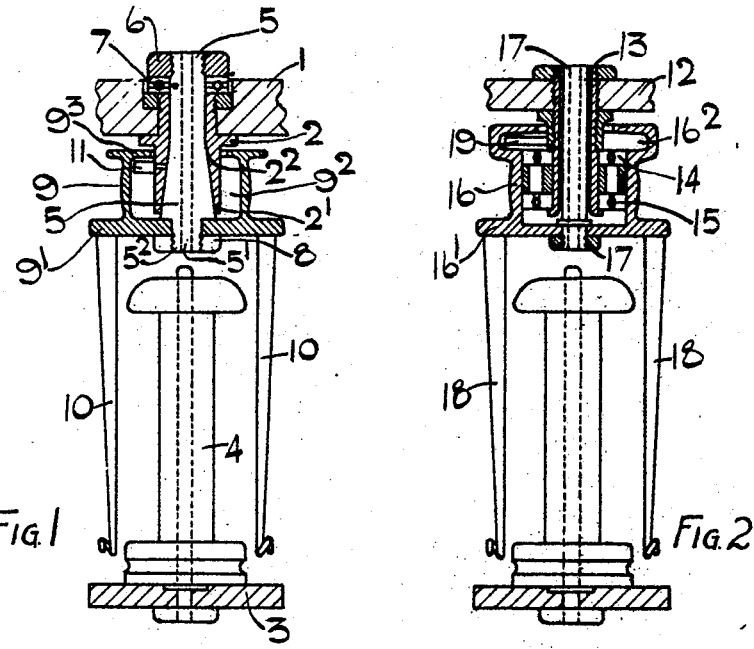
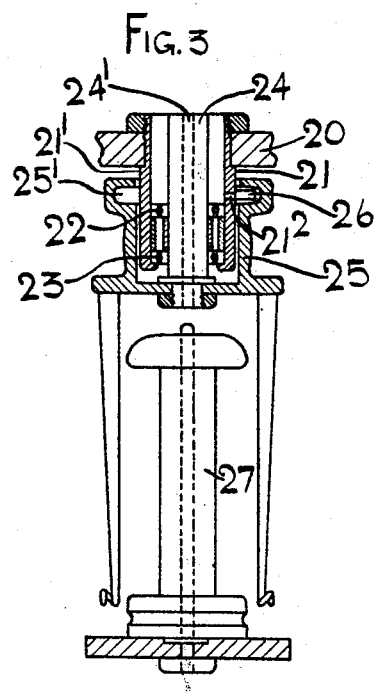
INVENTORS
THOMAS ALEXANDER BOYD
AND
HAROLD ARTHUR BOYD
BY THEIR ATTORNEYS
Howson and Howson Patented Feb. 17, 1931

1,793,355

UNITED STATES PATENT OFFICE

THOMAS ALEXANDER BOYD AND HAROLD ARTHUR BOYD, OF SHETTLESTON, NEAR GLASGOW, SCOTLAND

OILING OF FLYERS IN SPINNING AND LIKE FRAMES

Application filed December 6, 1928, Serial No. 324,226, and in Great Britain December 21, 1927.

This invention refers to flyer spinning and like frames in which the flyer is supported laterally above the flyer legs and has for its object the improved construction and forced lubrication of such flyer bearings.

According to this invention in flyer spinning and like frames in which the flyer has a lateral support above the flyer legs, a driven oil reservoir is provided, preferably inside of the wharve and a member inside of the oil cup stationary or rotating at a less speed than the oil cup and adapted to force the oil while working from the oil cup to the lateral support, and to cause the oil to circulate through the support. The latter support may be parallel or tapered or it may be a ball or roller bearing.

Accompanying this specification is one sheet of drawings wherein Figure 1 shows our invention applied to a lateral conical support; Figure 2 illustrates the invention in connection with a ball bearing lateral support, and Figure 3 shows another form having a ball bearing lateral support.

In giving a practical example of our invention as applied to the flyers of a jute spinning frame, we employ (see Fig. 1) a top rail 1, a bush stud 2 fixed on the under side of the top rail and coaxial with the spindle on a lifting rail 3 of ordinary construction and traversed in an ordinary manner, and a bobbin 4 on said spindle. The bush stud 2 here shown is bored with a taper, wide at its lower end $2^1$. In the bush stud 2 we mount a tapered axle 5 which is adjusted and kept vertically in position by a threaded nut 6. Below the threaded nut 6 we place a ball thrust washer 7 which supports the tapered axle 5. The tapered axle 5 has a hole $5^1$ through its axis for the yarn to pass to the flyer legs and spinning bobbin 4. The lower end $5^2$ of the taper axle 5 extends to a suitable distance beyond the bush stud 4 and has on it a shoulder and threaded nut 8. Between the shoulder and threaded nut 8 we fix a wharve 9 having a disc $9^1$ in which flyer legs 10 are held. Above the disc $9^1$ is a wharve 9 the outer surface of which is driven by a tape in a usual manner. The inner surface of the wharve 9 forms an oil cup $9^2$ surrounding the bush stud 2 and the taper axle 5 inside same. The oil cup $9^2$ is made with a flange $9^3$ extending inwards so as to retain the oil which is forced against it centrifugally. On the outside of the bush stud 2 we mount a flat spring 11 rigidly or embracing and free to revolve slowly on bush stud 2 and extending outwards close to the inner surface of the oil cup $9^2$. As the oil cup $9^2$ and the oil revolve the oil being carried against the flat spring 11 is forced inwards through an opening or openings in the bush stud 2 (here shown as a single opening adjacent the flat spring 11) to the axle 5 of the flyer. The oil enters the bush stud 2 towards its upper end $2^2$ and passes downwards back to the oil cup, being drawn downwards by the cone shape of the axle.

In a second example of our invention as applied to a jute spinning frame illustrated in Fig. 2, we employ a top rail 12 and a hollow fixed stud 13 mounted in the same coaxial with the spindle. On the hollow fixed stud 13 we mount two ball bearings 14 and 15 at a suitable distance apart. On the outer race of the ball bearings we mount a wharve 16 having a tube 17 passing upwards through the fixed hollow stud 13 but clear of the same. On the wharve 16 at its lower end we fix or form a disc $16^1$ which has flyer legs 18. In the outer wall of the wharve 16 above the upper ball race, we form an oil groove reservoir $16^2$ into which the oil is forced centrifugally when revolving. On the outside of the fixed hollow stud 13 opposite the oil groove reservoir $16^2$ we fix a flat finger 19 extending to the bottom of the oil groove reservoir. As the wharve revolves the oil is forced inwards to the ball bearings and thus lubricates them.

In giving a third example of our invention as applied also to a jute spinning frame in which we mount ball bearings on the axle of the flyer (see Fig. 3), we employ a top rail 20, a hollow stud 21 fixed in the same and extending downwards coaxial with the spindle, a pair of ball bearings 22 and 23, the outer races supported on the inside of the hollow stud 21 and the inner races fixed on the axle 24 provided for the flyer wharve 25. A hole $24^1$ is bored through the axle of the axle 24 for the yarn to pass downwards to the bobbin 27. The flyer wharve 25 is made with a groove $25^1$ forming an oil reservoir on its inner surface and situated above the ball races. On the outside $21^1$ of the hollow stud 21 we mount a flat plate 26 extending into the oil groove reservoir. An oil hole $21^2$ is bored through the hollow stud 21 to carry the oil forced inwards by the flat plate 26 to the upper side of the ball bearings 22 and 23 thus to lubricate them, the oil returning to the oil cup $25^1$.

We claim:

1. In flyer spinning or like frames, a wharve above the flyer legs, a stationary member, ball bearings inside of said wharve constituting a lateral support for said wharve, and an outer ball race supported on said stationary member, in combination with a stationary oil finger on said stationary member adapted to catch oil rotating within said wharve and to carry the oil inward to the ball bearings while the wharve is rotating.

2. In flyer spinning and like frames, a wharve above the flyer legs, ball bearings inside of said wharve constituting a lateral support for said wharve, a stationary member having a hole therein above said ball bearings, and an outer ball race supported on said stationary member, in combination with a stationary oil finger adjacent the hole on said stationary member adapted to catch oil rotating within said wharve and to carry the oil inward to the ball bearings while the wharve is rotating.

In testimony whereof we have signed our names to this specification.

T. A. BOYD.
H. A. BOYD.